United States Patent
Uozumi

(10) Patent No.: US 8,576,046 B2
(45) Date of Patent: Nov. 5, 2013

(54) PLAYBACK CONTROL APPARATUS AND AUDIO SYSTEM

(75) Inventor: Yasuhiro Uozumi, Konan (JP)

(73) Assignee: Suncorporation, Aichi (JP)

( * ) Notice: Subject to any disclaimer, the term of this patent is extended or adjusted under 35 U.S.C. 154(b) by 1418 days.

(21) Appl. No.: 11/990,154

(22) PCT Filed: Aug. 2, 2006

(86) PCT No.: PCT/JP2006/315304
§ 371 (c)(1),
(2), (4) Date: Jul. 16, 2008

(87) PCT Pub. No.: WO2007/018092
PCT Pub. Date: Feb. 15, 2007

(65) Prior Publication Data
US 2010/0219978 A1    Sep. 2, 2010

(30) Foreign Application Priority Data

Aug. 8, 2005 (JP) ................. 2005-229425

(51) Int. Cl.
*H04B 1/20* (2006.01)

(52) U.S. Cl.
USPC ........... 340/4.4; 340/693.1; 381/107; 307/85; 307/86; 320/115; 710/304

(58) Field of Classification Search
USPC ............... 340/4.4, 635, 568.3, 568.4, 568.2; 84/600, 601; 713/300, 340; 710/303, 710/304; 369/86, 230; 307/85, 86; 320/107, 320/114, 115, 162; 381/107, 111, 117
See application file for complete search history.

(56) References Cited

U.S. PATENT DOCUMENTS

| | | | |
|---|---|---|---|
| 5,260,795 A * | 11/1993 | Sakai et al. | 348/231.4 |
| 5,307,326 A | 4/1994 | Osawa | |
| 5,970,390 A | 10/1999 | Koga et al. | |
| 6,501,389 B1 * | 12/2002 | Aguirre | 340/4.41 |
| 7,280,802 B2 | 10/2007 | Grady | |
| 7,382,703 B2 | 6/2008 | Nakase et al. | |
| 7,593,782 B2 * | 9/2009 | Jobs et al. | 700/94 |
| 2002/0163780 A1 * | 11/2002 | Christopher | 361/686 |
| 2003/0088325 A1 | 5/2003 | Crutchfield | |
| 2003/0131715 A1 * | 7/2003 | Georges | 84/609 |
| 2003/0158614 A1 * | 8/2003 | Friel et al. | 700/94 |
| 2004/0224638 A1 | 11/2004 | Fadell et al. | |
| 2005/0049009 A1 | 3/2005 | Yamamoto | |

FOREIGN PATENT DOCUMENTS

| | | |
|---|---|---|
| JP | 56-135336 | 10/1981 |
| JP | 6-309854 | 4/1994 |
| JP | 8-46538 | 2/1996 |
| JP | 10-122106 | 5/1998 |
| JP | 2001-283502 | 10/2001 |
| JP | 2002-57588 | 2/2002 |
| JP | 2002-112353 | 4/2002 |
| JP | 2002-305458 | 10/2002 |
| JP | 2003-007040 | 1/2003 |

(Continued)

*Primary Examiner* — Daniel Wu
*Assistant Examiner* — Frederick Ott
(74) *Attorney, Agent, or Firm* — Christensen Fonder P.A.

(57) ABSTRACT

One aspect of the present invention can include a playback device capable of externally receiving a playback signal for playing back a sound or an image, and capable of transmitting the playback signal to the playback device if it is detected that a predetermined electric source was externally supplied.

10 Claims, 7 Drawing Sheets

(56) References Cited

FOREIGN PATENT DOCUMENTS

| | | |
|---|---|---|
| JP | 2003-169156 | 6/2003 |
| JP | 2003-345468 | 12/2003 |
| JP | 2004-139661 | 5/2004 |
| JP | 2004-206865 | 7/2004 |
| JP | 3105308 | 10/2004 |
| JP | 2005-539469 T | 12/2005 |
| JP | 2006-502515 T | 1/2006 |
| WO | WO 03/041077 A1 | 5/2003 |
| WO | WO 2004/008649 A1 | 1/2004 |

* cited by examiner

PLAYBACK CONTROL APPARATUS AND AUDIO SYSTEM

TECHNICAL FIELD

The present invention relates to a playback control apparatus and an audio system, and in particular to a playback control apparatus that can be electrically connected with a playback device capable of externally receiving a playback signal for playing back a sound or an image, and an audio system having this playback control apparatus.

BACKGROUND ART

As a playback control apparatus of this type, JP-A-6-309854 is already known for instance. In this technique, there is disclosed an audio system 101 shown in FIG. 6, and this audio system 101 is constituted by a playback device (CD player in an example of Patent Document 1) 102, an adapter 110, an on-vehicle antenna 104, an FM receiver (e.g., radio) 103, and left and right speakers 103a, 103b. This adapter 110 has a FM transmitter 107 inside. The FM transmitter 107 has a signal modulation circuit for FM-modulating a sound signal outputted from the CD player 102, and a carrier generator generating an FM carrier wave, and converts the sound signal outputted from the CD player 102 into a radio wave in an FM broadcast band of the radio 103 and outputs it. And, since this radio wave is received by the on-vehicle antenna 104, the sound signal of the CD player 102 is outputted from the left and right speakers 103a, 103b by tuning a frequency of this radio wave. By doing like this, it is possible to play back the CD player 102 by utilizing the radio 103 and the speakers 103a, 103b provided in an automobile.

Further, as shown in a block diagram of FIG. 7, this adapter 110 has a plug 112 capable of inserting into a cigarette lighter socket 127 installed in the automobile and, if an engine of the automobile is switched ON, an electric source is supplied from the cigarette lighter socket 127 to the adapter 110 through the plug 112. And, if the electric source is supplied to the adapter 110, it is converted into a desired voltage in an electric source circuit 111, and the electric source is supplied to the CD player 2 and the FM transmitter 107 through a connector 113.

Subsequently, a playback method of this CD player 102 will be described. A driver first connects the CD player 102 and the adapter 110 via a cable. Of course, if the CD player 102 and the adapter 110 are always connected, this connection work is unnecessary. Thereafter, the driver switches ON the engine of the automobile. Whereupon, since an electricity is applied to the cigar lighter socket 127, the electric source is supplied to the adapter 110 and the CD player 102. And, the driver presses down a playback button of the CD player 102. Whereupon, as mentioned above, the sound of the CD player 102 is outputted from the left and right speakers 103a, 103b.
Patent Document 1: JP-A-6-309854

However, in the above-mentioned technique, after applying the electricity to the sound playback device, since it is necessary to send playback instructions to the sound playback device by an operation of a user, the operation required before a sound output is troublesome because there is a problem that it is inconvenient. For example, in the case that the CD player is played back by the above audio system, the driver must press down the playback button of the CD player after switching ON the engine of the automobile. Therefore, a pressing-down operation of the playback button becomes a labor for the driver and, further if this pressing-down operation is performed during the movement of the automobile, it is not desirable from a viewpoint of safety.

Thus, there is a need in the art for a playback control apparatus that can contrive an improvement in operability or convenience of the user in a system in which the sound that is played back by a sound playback device is outputted from a speaker provided externally of the device.

SUMMARY OF THE PRESENT INVENTION

One aspect of the present invention can include a playback device capable of externally receiving a playback signal for playing back a sound or an image, and capable of transmitting the playback signal to the playback device if it is detected that a predetermined electric source was externally supplied.

DETAILED DESCRIPTION OF THE INVENTION

Hereunder, a best mode for carrying out the present invention will be explained by using the drawings.

Embodiment 1

Figure 2:
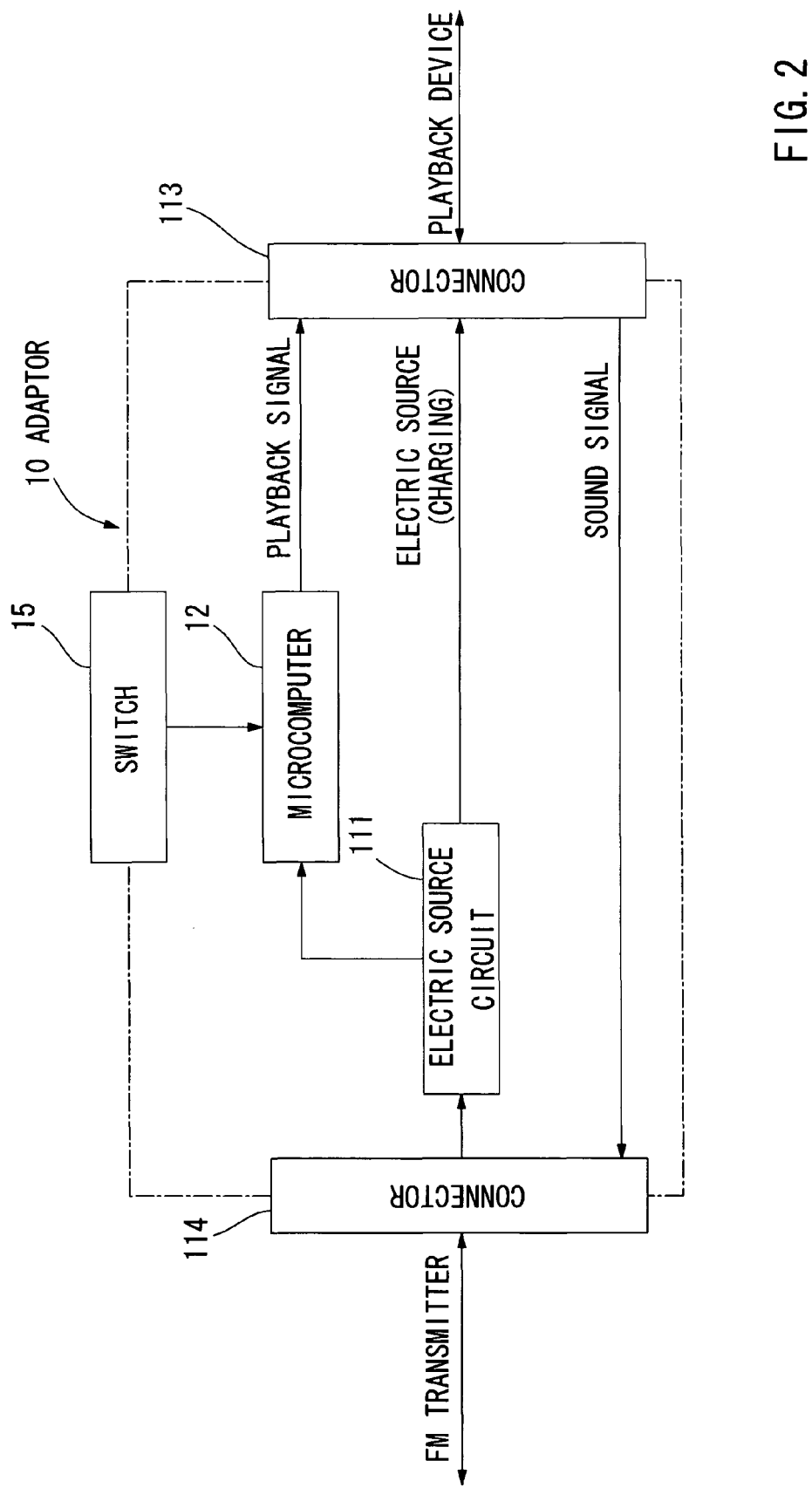
FIG. 2 is a block diagram showing an electrical configuration of an adapter shown in FIG. 1.
Figure 3:
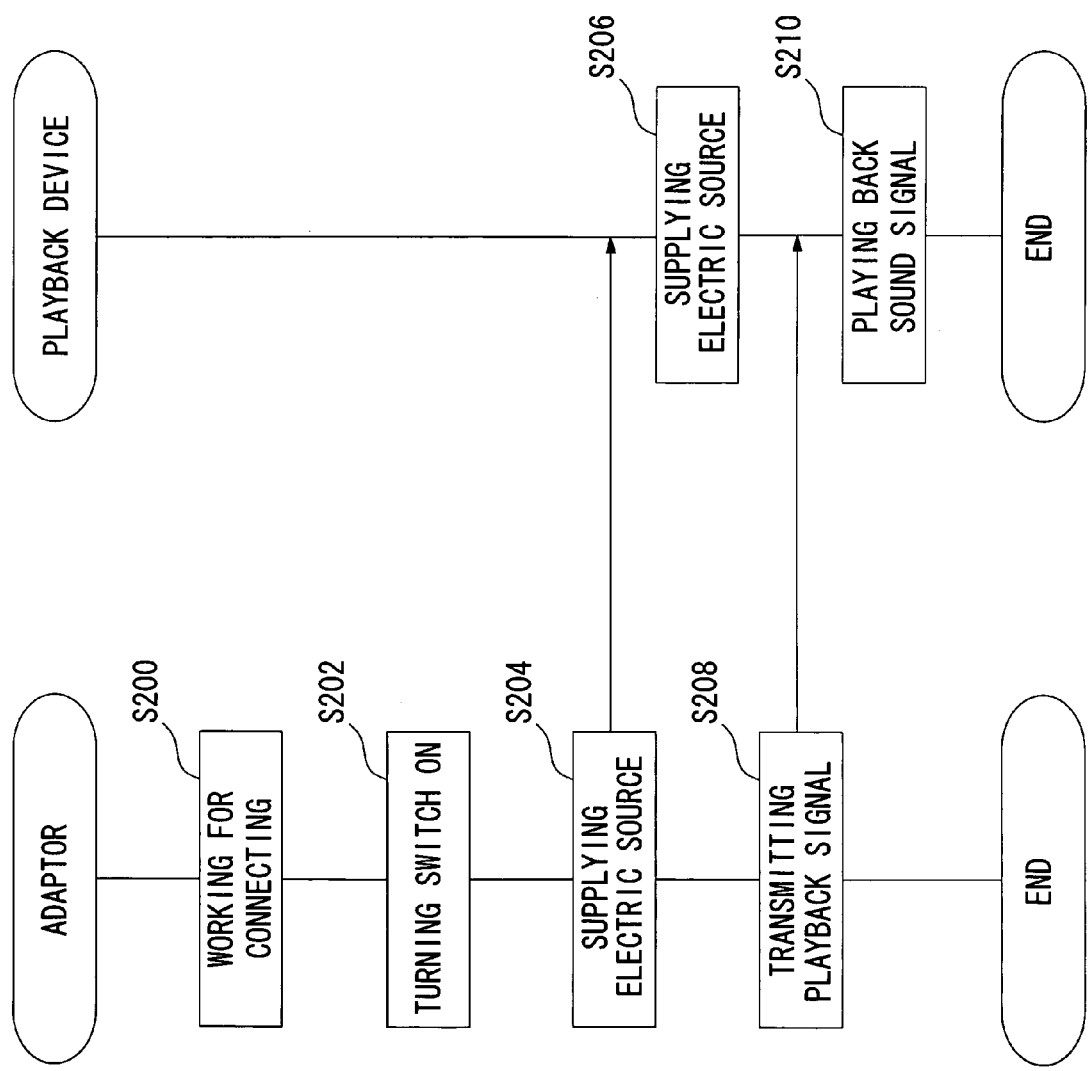
FIG. 3 is a flow diagram showing the operations of the adapter and a playback device.

First, an embodiment 1 of the present invention will be described by using FIG. 1-FIG. 3.

Figure 1:
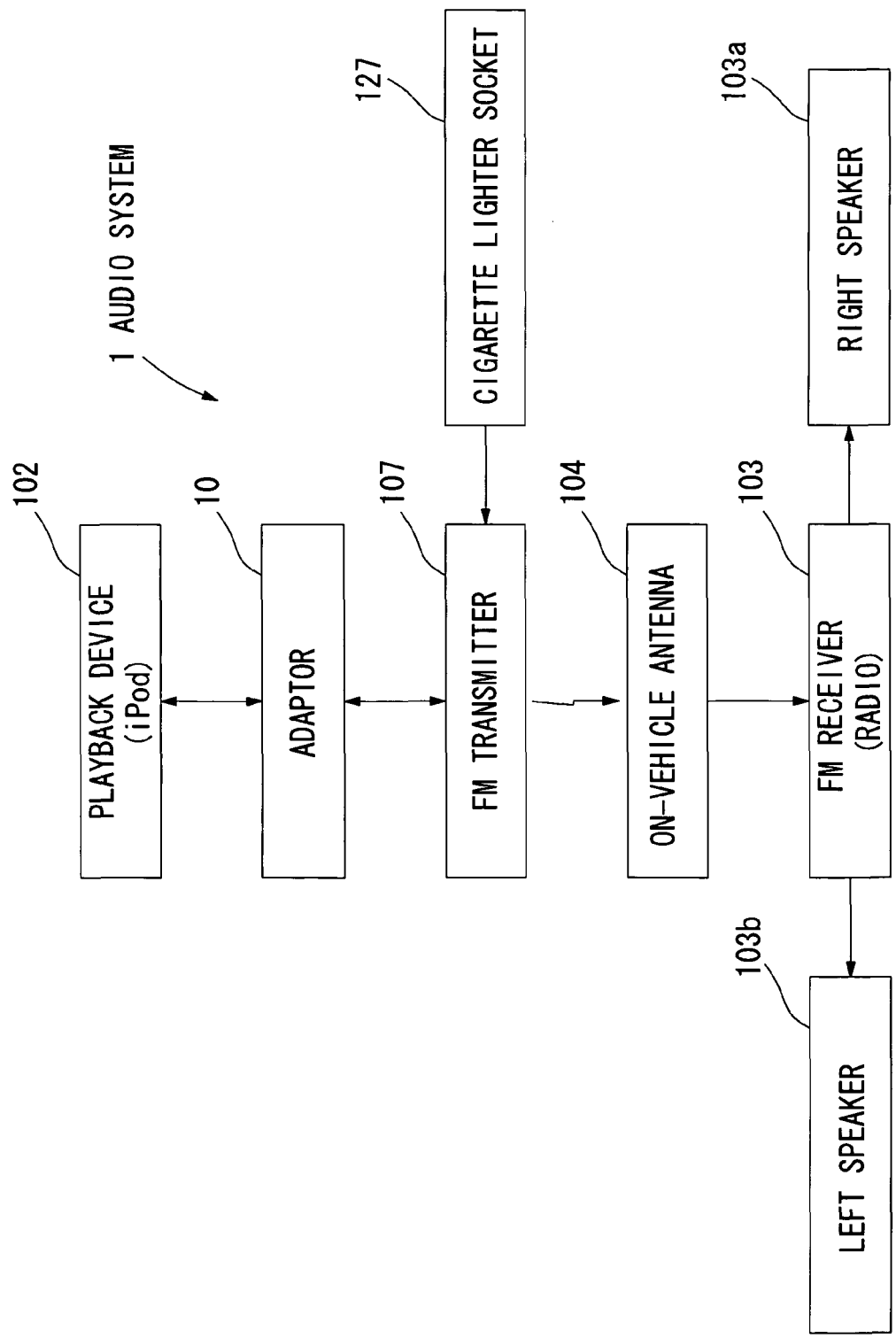
FIG. 1 is a system constitution diagram of an audio system 1 having a playback control apparatus 10 of the present invention.

FIG. 1 is a system constitution diagram of an audio system 1 having a playback control apparatus (hereinafter referred to as "adapter") 10 of the present invention. FIG. 2 is a block diagram showing an electrical configuration of the adapter 10 shown in FIG. 1. FIG. 3 is a flow diagram showing the operations of the adapter 10 and a playback device 102. Incidentally, for explaining this embodiment 1, by applying, in the drawings, the same reference numerals to elements, which have the same or equivalent construction as those in the explanation of the prior art, repeating its explanation is omitted. This is also applied to embodiment 2 that will be explained later.

As shown in FIG. 1, the audio system 1 is constituted by the playback device 102, the adapter 10, the FM transmitter 107, the on-vehicle antenna 104, the FM receiver (e.g., radio) 103, and the left and right speakers 103a, 103b. This playback device 102 is a device which plays back the sound, such as music, stored in its own storage medium (e.g., HDD), and it is possible to consider an iPod (registered trademark) and the like, for instance. As will be apparent also from this FIG. 1, in the audio system 1, the adapter 10 and the FM transmitter 107 are constituted as separate elements, and the adapter 10 is electrically connected between the playback device 102 and the FM transmitter 107.

And, this transmitter 107 has the plug (not shown in the drawing) capable of inserting into the cigarette lighter socket 127 similarly to the adapter 110 explained in the prior art. Therefore, if an engine of a vehicle, such as an automobile, is started, the electric source is supplied from the cigarette lighter socket 127 to the FM transmitter 107. Further, by the supply of the electric source to this FM transmitter 107, it follows that the electric source is supplied also to the adapter 10. Similarly, by the supply of the electric source to the adapter 10, it follows that the electric source is supplied also to the playback device 102.

In general, as this starting operation of the engine, the electric source is supplied to an accessory electric source line, and therefore, the electric source is supplied also to the cigarette lighter socket 127 connected with this accessory electric source line. Of course, in the case that the electric source supply to the cigarette lighter socket 127 is independent of the starting operation of the engine, the driver must perform a work (e.g., such as a work for pressing a previously determined button) for supplying the electric source to the cigarette lighter socket. Incidentally, as the operation for starting the engine, the operation for inserting a key into a key hole provided near a steering wheel and for rotating the key, and the operation for pressing a self-starting motor switch, or other operations may be considered Next, an internal constitution of the adapter 10 will be explained. As shown in FIG. 2, the adapter 10 is constituted by the electric source circuit 111, connectors 113, 114, a microcomputer 12, and a switch 15. The connector 113 is a connection terminal for connecting with the playback device 102, and this connector 113 and the playback device 102 can be connected by a cable. And, the adapter 10 transmits a later-mentioned playback signal to the playback device 102 via this connector 113 and supplies the electric source of the playback device 102, and further the playback device 102 transmits a sound signal to the adapter 10. Of course, also on the side of the playback device 102, there is provided a connection terminal for connecting with this connector 113.

The connector 114 is a connection terminal for connecting with the FM transmitter 107, and the connector 113 and the FM transmitter 107 can be directly connected (i.e., the adapter 10 can be connected to and disconnected from the FM transmitter 107 without using the cable). And, the adapter 10 transmits the sound signal to the FM transmitter 107 via this connector 114, and further the FM transmitter 107 supplies the electric source to the adapter 10. Of course, also on the side of the FM transmitter 107, there is provided a connection terminal for connecting with this connector 114.

The switch 15 can be held with its operation state being switched to either ON or OFF, and transmits its held state to the microcomputer 12. If it is detected in the electric source circuit 111, that a predetermined electric source (e.g., DC 12 V electric source) has been supplied, the microcomputer 12 transmits a playback signal to the playback device 102 through the connector 113 only when the operation state of the switch 15 is an ON-state. This playback signal is a signal for playing back a music signal stored in the storage medium of the playback device 102, and the playback device 102 is previously programmed such that, if it receives the playback signal concerned, a music information stored therein is played back as the sound signal.

Subsequently, the operation of the adapter 10 will be described with reference to FIG. 3. The driver of the vehicle, who is a user, uses cables to connect between the playback device 102 and the adapter 10, and between the FM transmitter 107 and the adapter 10, respectively (Step S200). Next, the switch 15 of the playback device 102 is brought to the ON-state (Step S202). Thereafter, the driver starts the engine of the automobile. Whereupon, since the electricity is applied to the cigarette lighter socket 127, the electric source is supplied to the FM transmitter 107, the adapter 10 and the playback device 102 (Steps S204, S206). If the electric source is supplied to the adapter 10, the microcomputer 12 detects a desired voltage, and therefore, it transmits the playback signal to the playback device 102 (Step S208).

As already described, the playback device 102 is under the state in which the electric source is supplied through the adapter 10, and therefore, if it receives this playback signal from the adapter 10, the playback device 102 plays back the stored music information as the sound signal (Step S210). And, the sound signal played back is sent from the playback device 102 to the FM transmitter 107 through the adapter 10, and is outputted from the left and right speakers 103a, 103b similarly to the prior art.

Further, if the driver turns OFF the engine of the automobile during playing back of the sound signal by the playback device 102, the electric source supply to the playback device 102 is interrupted, so that the playback device 102 stops the playback of the sound signal. Of course, even in the case that the supply of the electric source to the playback device 102 is made from its own built-in battery or the like, transmission of the playback signal to the playback device 102 is not possible, because the microcomputer 12 becomes unable to detect a desired voltage. Therefore, also in this case, the playback device 102 stops the playback of the sound signal.

Thereafter, if the playback device 102 and the adapter 10 are in a connected state and the switch 15 of the playback device 102 is in the ON-state, the playback device 102 starts the playback of the sound signal similarly to the above when the driver turns ON the engine of the automobile again. By this, if the engine of the automobile is turned ON, the driver can start the playback of the sound signal of the playback device 102. On the other hand, if the engine of the automobile is turned OFF, it is possible to stop the playback of the sound signal of the playback device 102. Therefore, in order to play back the playback device 102, it is unnecessary for the driver to press down the playback button of the playback device 102.

Embodiment 2

Subsequently, an embodiment 2 of the present invention will be explained by using FIGS. 4-5.

Figure 4:
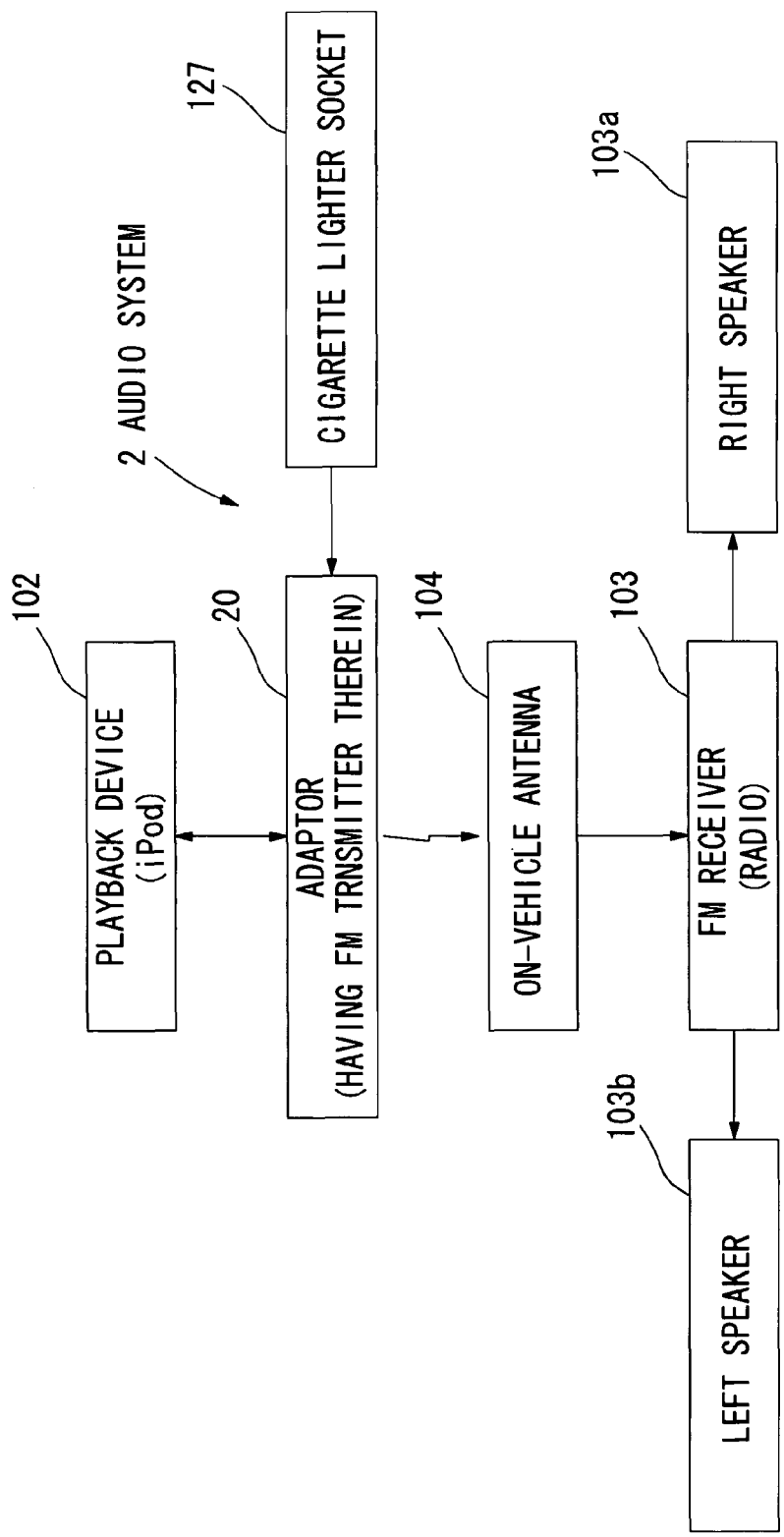
FIG. 4 is a system constitution diagram of an audio system having a playback control apparatus of the present invention.
Figure 5:
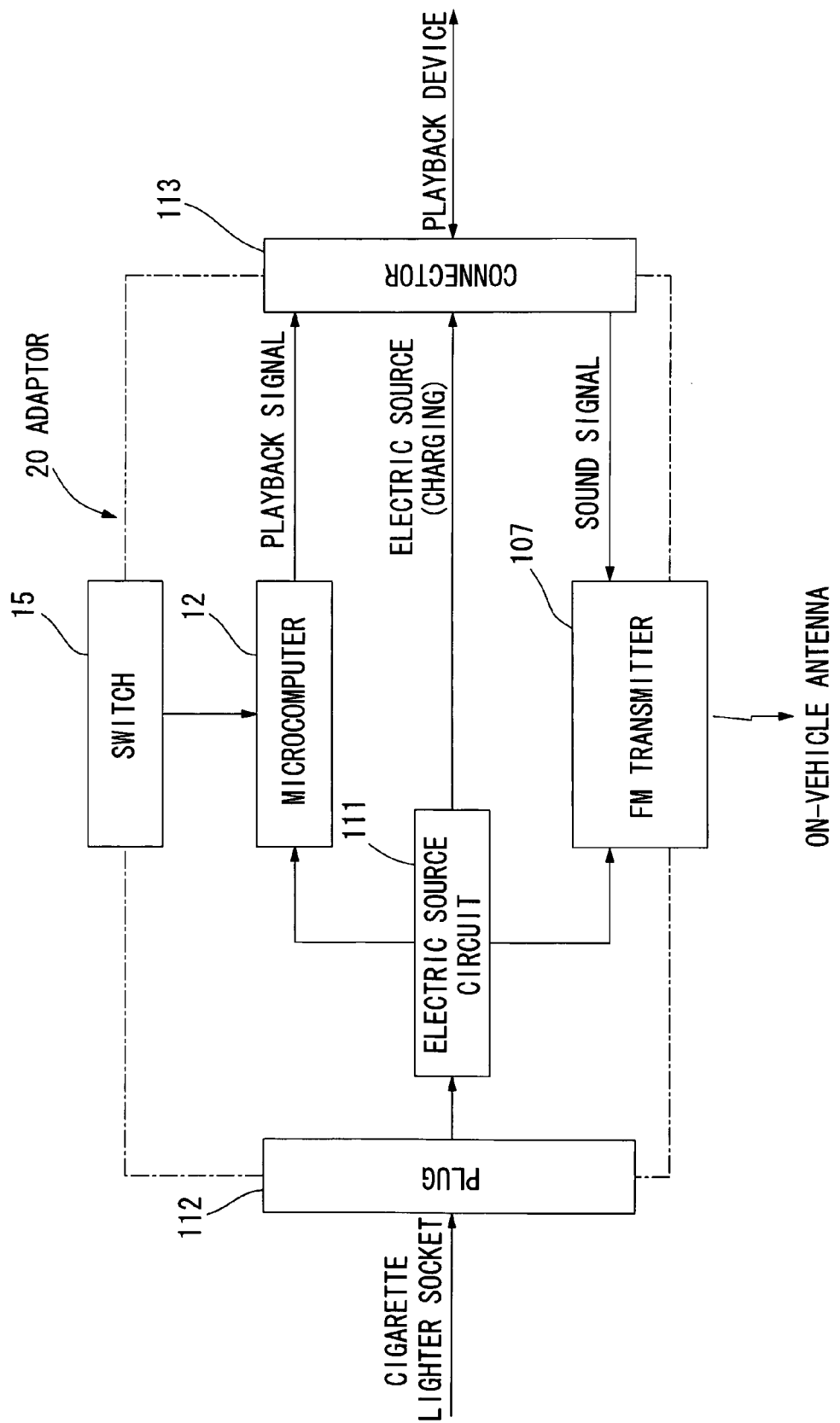
FIG. 5 is a block diagram showing an electrical configuration of an adapter shown in FIG. 4.
Figure 6:
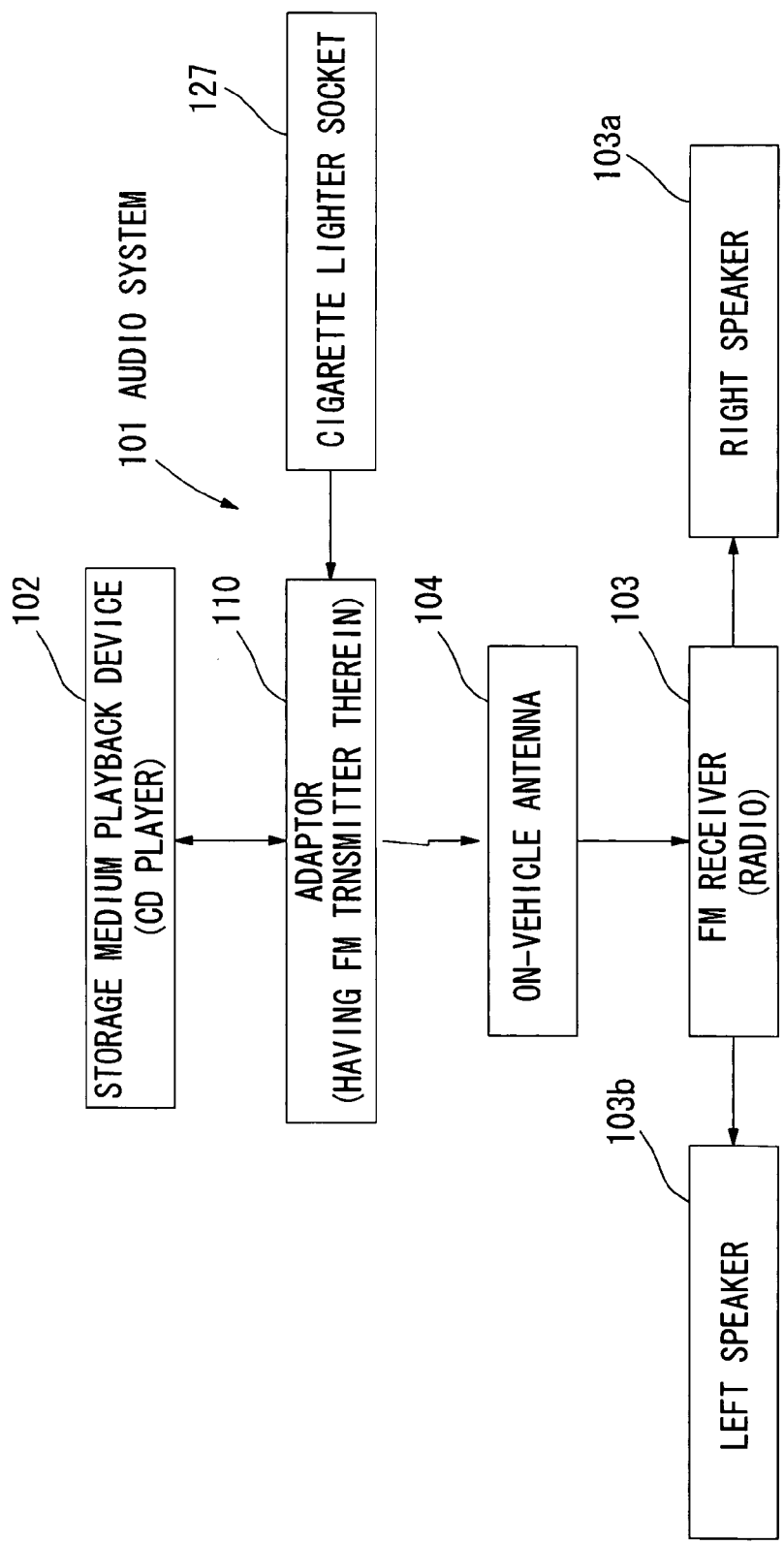
FIG. 6 is a system constitution diagram of a conventional audio system.
Figure 7:
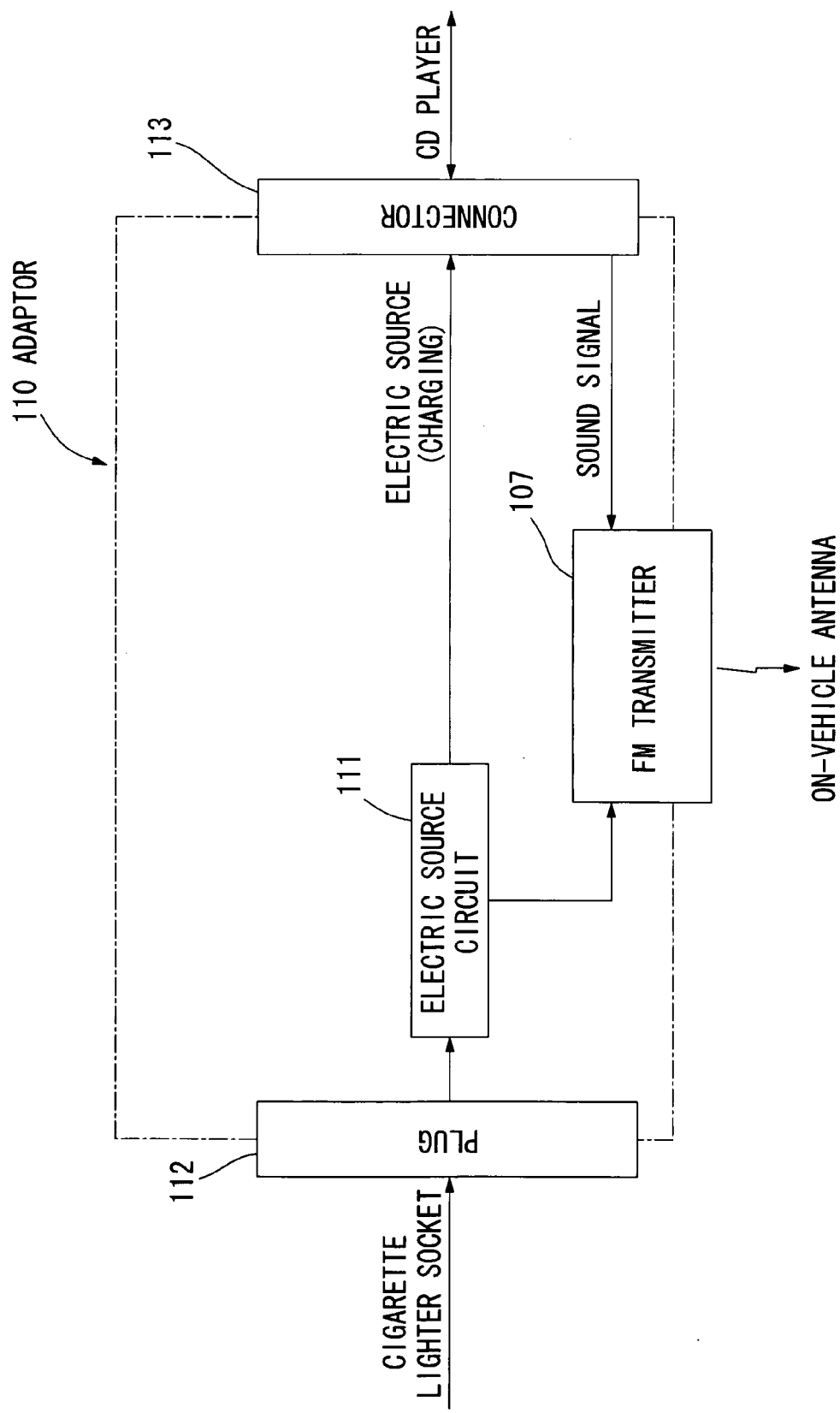
FIG. 7 is a block diagram showing an electrical configuration of an adapter described in FIG. 6.

FIG. 4 is a system constitution diagram of an audio system 2 having a playback control apparatus (hereinafter referred to as "adapter") 20 of the present invention. FIG. 5 is a block diagram showing an electric constitution of the adapter 20 described in FIG. 4. As will be apparent also from this FIG. 5, in this embodiment 2, the adapter 10 and the FM transmitter 107 explained in the embodiment 1 are constituted to be integral.

Therefore, the adapter 20 of embodiment 2 can play back the playback device 102 in the manner similar to the adapter 10 of the embodiment 1. Further, in comparing this adapter 20 with the adapter 10, it is not necessary for the driver to connect the adapter 20 and the FM transmitter 107 since the adapter 20 has the FM transmitter 107 disposed therein. Therefore, for the driver, this embodiment 2 has a more simple constitution than the constitution of the embodiment 1.

The above contents merely relate to one embodiment of the present invention, and do not mean that the invention is limited to the above contents.

In each embodiment, there is an example in which the electric source is supplied from the cigarette lighter socket 127 of the automobile. However, it is not limited to this, and may be the supply of a commercial electric source from a household plug socket. The type of the electric source is a matter of design that is determined in compliance with a place of use.

Further, in each embodiment, the constitution in which the FM transmitter 107 is used to output the sound signal of the playback device 102 from the left and right speakers 103a, 103b as an example. However, it is not limited to this, and may be a constitution in which the FM transmitter 107 is not used. In that case, the playback device 102 and the left and right speakers 103a, 103b are constituted as separate elements, and they are constituted to be able to be electrically connected via a cable or the like. Of course, the playback device 102 and the left and right speakers 103a, 103b are constituted to be integral, and they are electrically connected within inside.

Further, in each embodiment, the constitution in which the playback device 102 is played back by utilizing an existing audio system in the automobile is an example. However, it is not limited to this, and may be constituted such that it is applied to the case where the playback device 102 is charged in a room of one's own house as an example. In explaining about that case, in a battery charger of the playback device 102, provided is the adapter 10, an amplifier and the speakers 103a, 103b. And, when the user of the playback device 102 returns to the room and inserts the playback device 102 to the battery charger, in a manner similar to the embodiment 1, the electric source is supplied to the playback device 102 from the battery charger and the playback signal is transmitted. With this, it follows that the sound signal is transmitted from the playback device 102 to the battery charger and the music is outputted from the speakers 103a, 103b through the amplifier. Further, since the switch 15 is provided in this battery charger similarly to the embodiment 1, it may suffice if this switch 15 is in the off state in the case that it is desired to merely charge without playing back the playback device 102.

Further, in each embodiment, the constitution in which the playback device 102 plays back sound, was explained as an example. However, it is not limited to this, and the playback device 102 may be constituted to play back an image. In that case, each of the audio systems 1, 2 may be constituted to have a display instead of the left and right speakers 103a, 103b. Of course, the playback device 102 may be constituted to play back both of the sound and the image. In that case, each of the audio systems 1, 2 may have the left and right speakers 103a, 103b and the display.

The invention claimed is:

1. A playback control apparatus for use with a playback device having a battery and capable of receiving a playback signal for playing back a sound signal, the playback control apparatus comprising:
   a connector configured to removably connect the playback control apparatus electrically to the playback device, the playback device including a battery;
   a microcomputer configured to detect that a predetermined electric source is externally supplied to the playback control apparatus, and to automatically transmit the playback signal to the playback device when the detected predetermined electric source is externally supplied to the playback control apparatus; and
   an FM transmitter receiving the sound signal played back by the playback device and transmitting the sound signal.

2. The playback control apparatus according to claim 1, wherein the FM transmitter transmits the sound signal as a radio wave.

3. The playback control apparatus according to claim 1, wherein the connector transmits the playback signal to the playback device and receives the sound signal from the playback device.

4. The playback control apparatus according to claim 1, wherein the connected playback device includes a storage medium for storing the sound as a playback object.

5. The playback control apparatus according to claim 1, further comprising:
   a plug configured to mate with an electric source supply part of a vehicle that supplies an electric source; and
   wherein the predetermined electric source is supplied from the electric source supply part through the plug when an operation for starting an engine of the vehicle is performed.

6. The playback control apparatus according to claim 1, further comprising:
   a switch having an operation state of either ON or OFF;
   wherein only when the operation state of the switch is ON is the playback signal transmitted to the playback device.

7. The playback control apparatus according to claim 1, wherein the microcomputer detects a desired voltage.

8. The playback control apparatus according to claim 1, wherein the playback device is played back by utilizing an existing audio system in an automobile.

9. The playback control apparatus according to claim 1, wherein the sound signal of the FM transmitter is transmitted to an on-vehicle antenna for a FM receiver.

10. An audio system for outputting a sound or an image comprising:
    a playback device capable of outputting a sound or an image from at least one of a speaker or a display, the playback device including a battery and configured to receive an external playback signal to initiate the play of the sound or the image, and
    a playback control apparatus comprising:
    a connector configured to removably connect the playback control apparatus electrically to the playback device;
    a microcomputer configured to detect that a predetermined electric source is externally supplied to the playback control apparatus, and to automatically transmit the playback signal to the playback device when the detected predetermined electric source is externally supplied to the playback control apparatus; and
    an FM transmitter receiving the sound signal played back by the playback device and transmitting the sound signal.

* * * * *